G. A. HOLMES.
STUD FOR SNAP FASTENERS.
APPLICATION FILED JULY 1, 1920.

1,389,758.

Patented Sept. 6, 1921.

Inventor
George A. Holmes
by Jos. P. Livermore
Attorney

UNITED STATES PATENT OFFICE.

GEORGE A. HOLMES, OF NEWTON CENTER, MASSACHUSETTS, ASSIGNOR TO UNITED STATES FASTENER COMPANY, A CORPORATION OF MAINE.

STUD FOR SNAP-FASTENERS.

1,389,758.

Specification of Letters Patent.  Patented Sept. 6, 1921.

Application filed July 1, 1920. Serial No. 393,356.

*To all whom it may concern:*

Be it known that I, GEORGE A. HOLMES, a citizen of the United States, and residing at 140 Sumner St., Newton Center, Massachusetts, have invented certain new and useful Improvements in Studs for Snap-Fasteners, of which the following is a specification.

This invention relates to the stud member of a snap fastener of the kind commonly used in the body work of carriages and automobiles to coöperate with a resilient socket member in a curtain or other part to be detachably fastened to the body.

Such stud members commonly have a threaded shank like that of an ordinary wood screw, but as heretofore made the head is of special form, different from that of a wood screw, in order to coöperate properly with the resilient socket.

The object of the present invention is to produce a stud member which can be made with an ordinary wood screw as one of its components and can thus be produced more expeditiously and at much less cost than those heretofore manufactured.

In the accompanying drawings illustrating the invention:—

Figure 1:
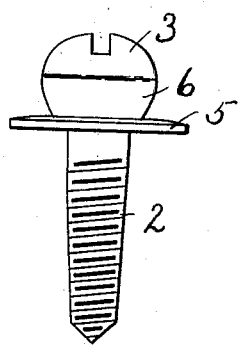
Figure 2:
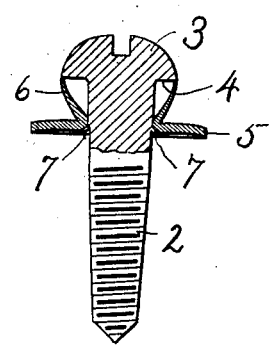

Figure 1 is a side elevation of a stud member embodying this invention;

Fig. 2 a sectional view thereof; and

Figure 3:
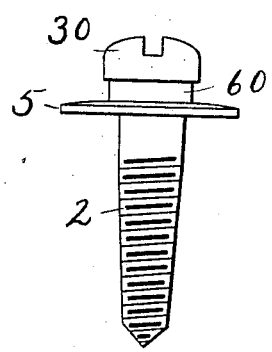
Figure 4:
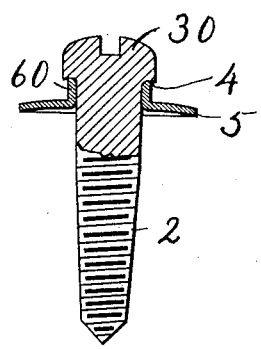

Figs. 3 and 4 similar views of a modified form.

Stud members of the form shown in Fig. 1 have usually been made from a screw having a solid head, approximately spherical in shape, and a flat washer secured upon the shank at the junction of the head therewith.

Such screws have to be made by special tools and are quite costly, and at times are very difficult to obtain.

In accordance with the present invention one component of the stud is a wood screw such as is a standard article of commerce, being shown in Figs. 1 and 2 as a round head screw, having a threaded shank 2, and a head 3, approximately hemispherical in shape and having a flat lower surface 4, which forms a shoulder at right angles to the shank.

In order to provide a suitable head for engagement by the resilient socket, as well as to insure the proper position of the head relative to the body or part to which the stud is secured and to afford a suitable finish, the screw is provided with a base and filling piece made from a single piece of metal drawn to the proper shape.

The base portion of said piece is in the form of a flat flange 5 which extends from the shank of the screw at some distance below the lower face 4 of the head 3, while the filling portion 6 extends from the base 5 to said face 4 of the screw head, and as shown in Figs. 1 and 2, engages the head at its outer periphery and constitutes therewith a substantially spherical bulb such as is required for the stud member of this type of fastener.

At the junction of the base and filling portions the piece fits snugly on the shank of the screw, and it is tightly secured on said shank by slightly scoring and upsetting the metal of the shank against the base 5 as indicated at 7.

The portion 6 thus fills the space between the base 5 and the head 3 of the screw proper, and affords the slightly contracted portion or neck to receive the resilient socket after it has been passed over the larger part of the stud, the same as is the case when a stud with a solid head is used, while the base 5 insures that the head is at the proper distance from the material of the body in which the stud is secured for use, and also enhances the strength of the hold of the screw in the material and affords a suitable finish.

In the modification shown in Figs. 3 and 4, the screw is of another standard commercial form and size, the head 30 of which is convex on top and has a flat lower surface 4 at right angles to the threaded shank 2 which limits or stops the entrance of the screw into the material when used in the ordinary way.

The stud member is completed by a unitary base and filling piece of the same character as the one already described but in this case the filling portion 60 does not extend to the outer edge of the screw head but leaves a slight shoulder around the neck afforded by the said filling portion 60.

The base and filling piece 5, 60, performs the same functions and serves the same purpose as the one shown in Figs. 1 and 2, and together with the screw head 3, 30, produces a stud member suitable for coöperating with certain constructions of socket member.

I claim:

A stud member of a snap fastener, composed of a screw having a head which is approximately hemispherical on its upper surface and plane on its lower surface, and a base and filling piece secured on the shank of the screw, the base portion of which constitutes a flange projecting from the shank of the screw, and the filling portion of which extends from the inner edge of said flange to the outer edge of the screw head, and constitutes with said screw head an approximately spherical stud proper, which coöperates with a resilient socket member.

GEORGE A. HOLMES.